(12) United States Patent
Wang et al.

(10) Patent No.: US 7,171,059 B1
(45) Date of Patent: Jan. 30, 2007

(54) METHOD AND APPARATUS FOR TWO-DIMENSIONAL IMAGE SCALING

(75) Inventors: Zhongde Wang, Camas, WA (US); Carmen Tseng, Tigard, OR (US)

(73) Assignee: Pixelworks, Inc., Tualatin, OR (US)

( * ) Notice: Subject to any disclaimer, the term of this patent is extended or adjusted under 35 U.S.C. 154(b) by 692 days.

(21) Appl. No.: 10/154,543

(22) Filed: May 23, 2002

(51) Int. Cl.
   *G06K 9/32* (2006.01)
   *H04N 7/01* (2006.01)
   *H04N 11/20* (2006.01)

(52) U.S. Cl. .................... 382/300; 348/448; 348/458

(58) Field of Classification Search ........ 382/296–300; 348/458, 448
   See application file for complete search history.

(56) References Cited

U.S. PATENT DOCUMENTS

| | | | |
|---|---|---|---|
| 4,680,720 A * | 7/1987 | Yoshii et al. ............... | 345/472 |
| 5,019,903 A * | 5/1991 | Dougall et al. ............. | 348/448 |
| 5,054,100 A * | 10/1991 | Tai .............................. | 382/300 |
| 5,257,326 A * | 10/1993 | Ozawa et al. ............... | 382/300 |
| 5,296,941 A * | 3/1994 | Izawa et al. ................. | 382/169 |
| 5,511,137 A * | 4/1996 | Okada ......................... | 382/298 |
| 5,513,281 A * | 4/1996 | Yamashita et al. .......... | 382/278 |
| 5,526,020 A * | 6/1996 | Campanelli et al. ........ | 382/165 |
| 5,579,053 A | 11/1996 | Pandel ........................ | 348/448 |
| 5,703,968 A * | 12/1997 | Kuwahara et al. .......... | 382/269 |
| 5,832,143 A * | 11/1998 | Suga et al. .................. | 382/300 |
| 5,852,470 A * | 12/1998 | Kondo et al. ............... | 348/448 |
| 5,917,963 A * | 6/1999 | Miyake ....................... | 382/300 |

(Continued)

OTHER PUBLICATIONS

Gonzalez, R., Woods, R., Digital Image Processing, 1992, Addison-Wesley, ISBN 0-201-50803-6, p. 198-199.*

(Continued)

*Primary Examiner*—Bhavesh M. Mehta
*Assistant Examiner*—Sath V. Perungavoor
(74) *Attorney, Agent, or Firm*—Marger Johnson & McCollom P.C.

(57) ABSTRACT

An output pixel datum is produced from input pixel data by a method wherein the brightness levels of several input pixels closely associated coordinate-wise with the output pixel, are examined to determine whether a relatively less complex graphics-optimized scaling procedure, or a relatively more sophisticated video-optimized scaling procedure, should be carried out. In the second case, directional interpolation is performed with a plurality of directions, e.g., being considered to determine the direction of minimum brightness level gradient. A plurality of intermediate pixels, e.g., four, are produced, which are aligned perpendicularly to the minimum brightness level gradient direction, their brightness levels being determined from relevant input pixels using linear interpolation. The output pixel brightness level is determined from the intermediate pixels through the use of an appropriate filtering technique, e.g., polyphase FIR filtering. An apparatus for performing the method and a system incorporating the apparatus, are described.

28 Claims, 14 Drawing Sheets

U.S. PATENT DOCUMENTS

| | | | |
|---|---|---|---|
| 5,946,044 A * | 8/1999 | Kondo et al. | 348/458 |
| 5,966,183 A * | 10/1999 | Kondo et al. | 348/458 |
| 5,991,463 A * | 11/1999 | Greggain et al. | 382/298 |
| 6,005,989 A * | 12/1999 | Frederic | 382/300 |
| 6,009,213 A * | 12/1999 | Miyake | 382/300 |
| 6,157,749 A * | 12/2000 | Miyake | 382/300 |
| 6,219,464 B1 * | 4/2001 | Greggain et al. | 382/298 |
| 6,266,454 B1 * | 7/2001 | Kondo | 382/300 |
| 6,324,309 B1 * | 11/2001 | Tokuyama et al. | 382/300 |
| 6,408,109 B1 * | 6/2002 | Silver et al. | 382/300 |
| 6,463,178 B1 * | 10/2002 | Kondo et al. | 382/232 |
| 6,690,842 B1 * | 2/2004 | Silver et al. | 382/300 |
| 2001/0035969 A1 * | 11/2001 | Kishimoto | 358/1.9 |
| 2002/0076121 A1 * | 6/2002 | Shimizu et al. | 382/300 |
| 2003/0007702 A1 * | 1/2003 | Aoyama et al. | 382/300 |

OTHER PUBLICATIONS

Kwok, W., Sun, H., Multi-directional interpolation for spatial error concealment, Aug. 1993, Consumer Electronics, IEEE Transactions on, ISSN: 0098-3063, INSPEC Accession No. 4561878.*

* cited by examiner

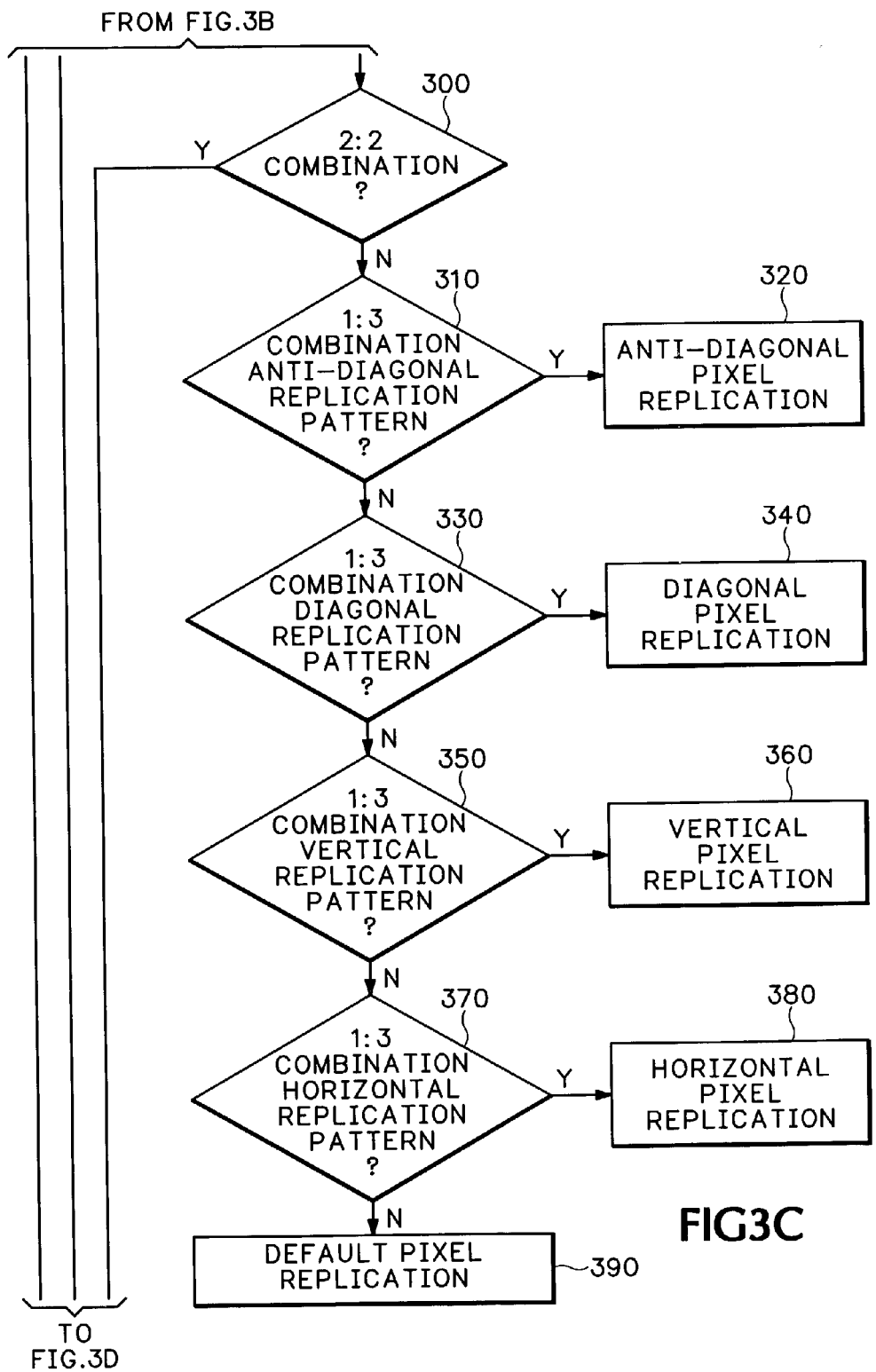

METHOD AND APPARATUS FOR TWO-DIMENSIONAL IMAGE SCALING

FIELD OF THE INVENTION

The present invention relates to a method and apparatus for scaling digital images and, more particularly, a method and apparatus for scaling images in two dimensions.

BACKGROUND OF THE INVENTION

It is often desired to scale an image to an arbitrary size. It is common practice when scaling to do so independently in the horizontal and vertical directions. The images produced using such an approach, however, tend to suffer from poor image quality including jagged edges, commonly known as "stair-stepping".

Directional interpolation improves image quality by reducing stair-stepping when scaling an image. Algorithms incorporating directional interpolation techniques analyze the local brightness-gradient characteristics of the image and perform interpolation based on those characteristics.

U.S. Pat. No. 5,579,053 to Pandel discloses a method for raster conversion by interpolating in the direction of minimum change in brightness value between a pair of points in different raster lines fixed by a perpendicular interpolation line.

U.S. Pat. No. 6,219,464 B1 to Greggain et al. discloses a method and apparatus to generate a target pixel positioned between two lines of input source data. The Greggain method includes comparing pixels of different lines of the source data in a region surrounding the target pixel and then obtaining the target pixel along a direction that has the minimum change in brightness value between a pair of pixels and a horizontal direction.

The Pandel and Greggain methods have associated disadvantages. Designed for use solely with interlaced video images, both Pandel and Greggain methods select a minimum-brightness direction for interpolation from a set of directions which do not include the horizontal direction, a basic direction for any image.

The Greggain method produces an output pixel by interpolating in the horizontal direction as a final step. This is not optimal since the horizontal direction is in general not orthogonal to the direction of minimum brightness change. Furthermore, the Greggain method, like that of Pandel, utilizes only liner interpolation techniques for producing the output pixel. Linear interpolation, acceptable for use when interpolating in the minimum-brightness change direction due to the low spatial frequencies present along that direction, is sub-optimal when interpolating in other directions due to the higher spatial frequencies of brightness change present in those directions. In the case of graphic image sources, the Pandel and Greggain methods tend to cause text overshoot or ringing that will adversely impact image quality.

BRIEF SUMMARY OF THE INVENTION

We describe method and apparatus for two-dimensional image scaling. The method includes determining a sub-image including an array of input pixels and evaluating a brightness for each input pixel contained within the sub-image. And the method includes determining a number of brightness levels associated with the sub-image, selecting at least one of a plurality of replication techniques responsive to the number of brightness levels, and applying the selected replication technique to the sub-image.

BRIEF DESCRIPTION OF THE DRAWINGS

FIGS. 3A–3E are a flowchart of a method for producing an output pixel from the pixel source input data according to the present invention.

DESCRIPTION OF THE PREFERRED EMBODIMENTS

Figure 1A:
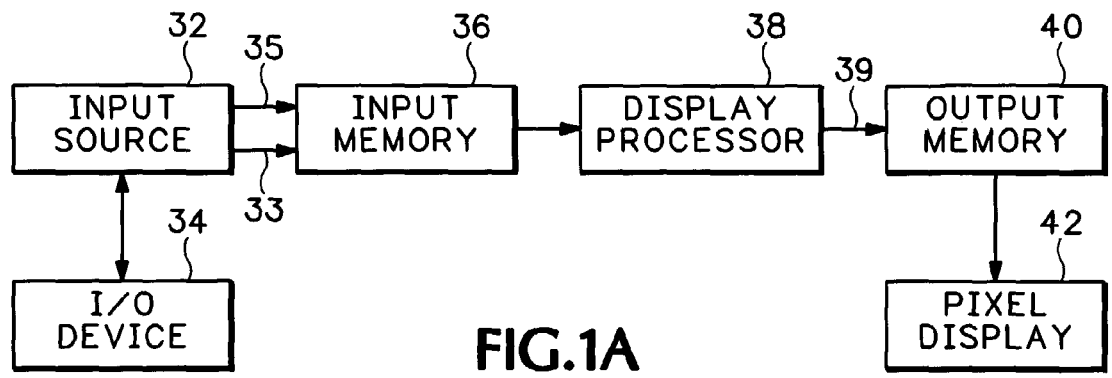
FIG. 1A is a display system incorporating the invention.

The present invention is implemented in a display system 30 as shown in FIG. 1A. This system includes image source 32, I/O device 34, input memory 36, display processor 38, output memory 40 and pixel display 42.

The image source 32 is a CPU or other device capable of generating image data directly, and of receiving image data from yet other sources such as I/O device 34. The image source 32 operates to place image data 33 and image-processing commands 35 in input memory 36, which is also accessible by the display processor 38. The display processor produces a scaled output image 39 in output memory 40, which is also accessible by the pixel display 42. The pixel display retrieves the output image 39 present in the output memory 40 and displays it.

Figure 1B:
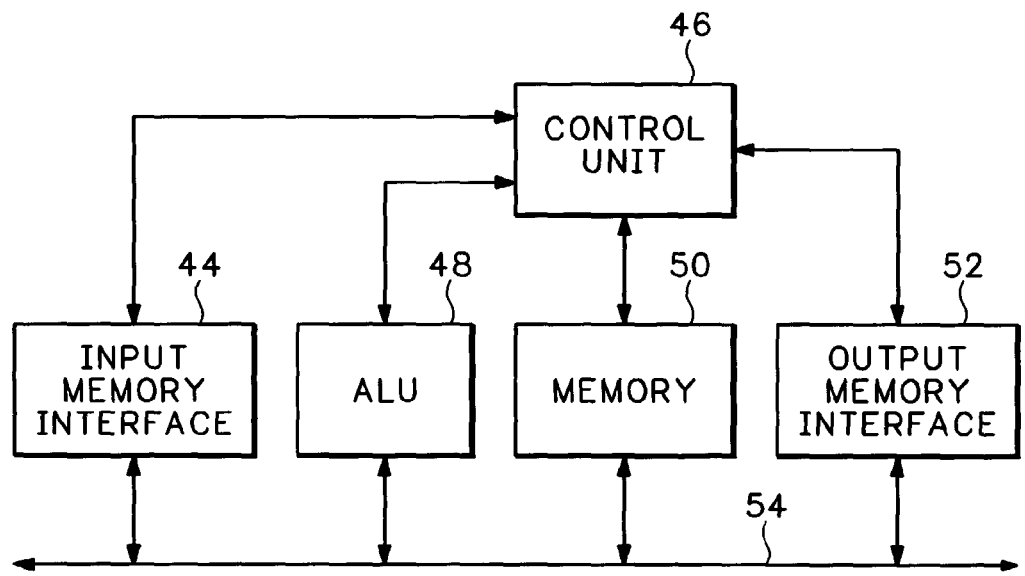
FIG. 1B illustrates details concerning the display processor of FIG. 1A.

The display processor 38 is shown in further detail in FIG. 1B and includes input memory interface 44, control unit 46, arithmetic-logic unit (ALU) 48, memory 50, output memory interface 52 and processing bus 54. Control unit 46, which those skilled in the art will understand can be implemented in a variety of manners, including as miscellaneous logic or based on a microcontrol store read-only memory, supervises the functioning and interaction of the other units shown in FIG. 1B. The control unit 46 through input memory interface 44 accesses the input image data 33 (FIG. 1A) and processing commands 35 (FIG. 1A) present in input memory 36 (FIG. 1A). The control unit 46 also controls ALU 48 to perform the arithmetic and logic processing of data necessary to perform the image scaling procedure. Additionally, the control unit 46 stores and retrieves intermediate computational results to and from memory 50. The control unit 46 through output memory interface 52 places the output image data 39 (FIG. 1A) in output memory 40 (FIG. 1A). Processing bus 54 provides a means to move data directly between the various data-handling units of FIG. 1B.

The method of the invention is to produce as output a scaled version of an input pixel data source in which the processing performed is determined by the type of the relevant local input data, namely either graphics-generated data or video (natural image) data.

For each target output pixel, the type of the relevant source data is determined by examination of the brightness levels of four pixels of the input data that are geometrically most closely associated with the target output pixel. Video-source data is assumed in the case the pixels exhibit four distinct brightness levels, while graphics-generated data is generally assumed otherwise. The invention uses a video-optimized scaling procedure in the case of video-source data, or selects one of five graphics-optimized scaling procedures to be applied in the case of graphics-source data.

For video-source data, the invention utilizes a directional interpolation technique, wherein intermediate pixels that are produced in the process are aligned perpendicularly to the direction of minimum brightness level change. The technique additionally makes use of polyphase finite impulse response (FIR) filtering in the production of the output target pixel from the intermediate pixels.

The method of the invention applies to both black and white (gray scale) images, as well as to color images. In the former case, it is the gray level of the pixel that is considered the brightness level. In the latter case, RGB or YUV representations are commonly employed, although other representations come within the scope of the invention. For the RGB representation, the individual color component intensity level (red, blue or green) may be used as the brightness level; for the YUV representation, the Y component value is used for the brightness level.

In many of the actions performed in the method, comparisons are carried out to determine whether the brightness levels of two particular pixels are equal to each other, or to determine the number of distinct brightness levels exhibited by some number of pixels. Such comparisons may be carried out by first taking the difference of two brightness level values, and then determining whether the result is zero. Since brightness level values are subject to the influence of noise and other non-ideal factors, a range of result values that are close to zero but not necessarily exactly equal to zero, may optionally be accepted as being functionally equivalent to zero in the procedure just outlined.

Figure 2:
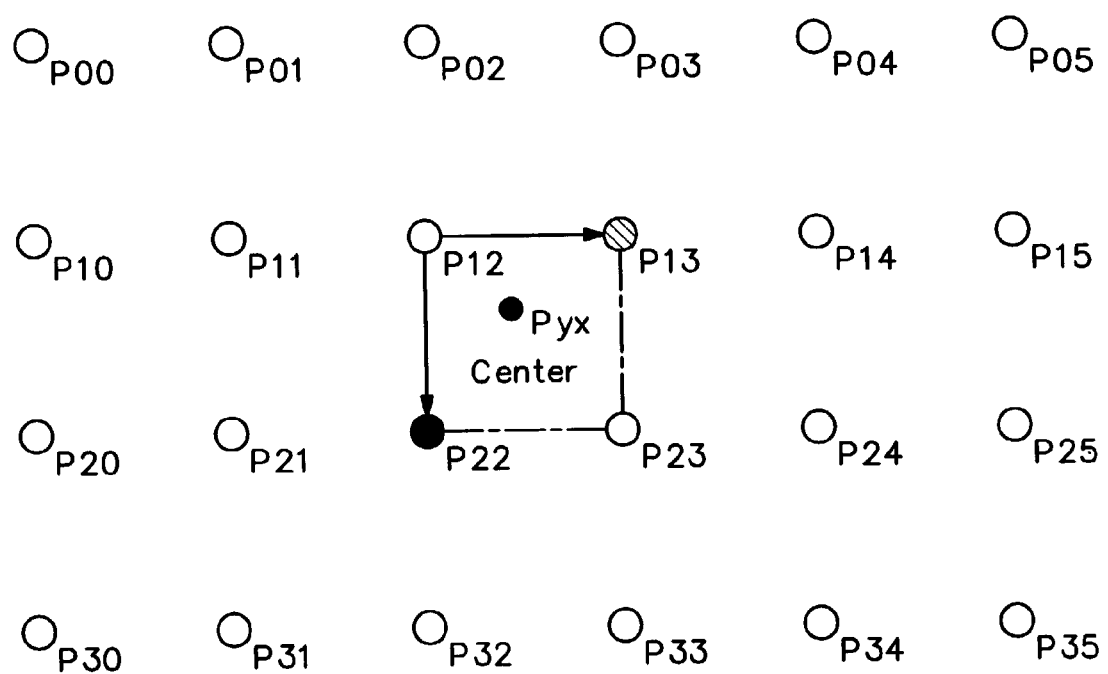
FIG. 2 is a 4×6 sub-image of the source pixel data, with output target pixel Pyx residing in a center region defined by four center input pixels P12, P13, P22 and P23.

FIG. 2 shows a target output pixel Pyx. The four input pixels that are most closely associated with pixel Pyx coordinate-wise may be said to form a "center" region encompassing pixel Pyx, as shown in the figure. The brightness levels of the four center pixels (P12, P13, P22 and P23 in the figure) are instrumental in determining the type of procedure to be applied in order to compute the brightness level of pixel Pyx.

As discussed in more detail below, the existence of certain patterns of brightness levels in the four center pixels is sufficient in and of itself to specify the computational procedure to be employed. In the general case, however, the patterns of brightness levels present in various of the input pixels surrounding the center region must additionally be taken into consideration to determine the computational procedure to be carried out.

The brightness levels of certain of the input pixels in as large an area as a 4×6 sub-image portion of the input pixel data set may need to be examined in order to perform the method of the invention. Such a sub-image has the target output pixel Pyx and the center four input pixels at its center, as shown in FIG. 2.

The input pixel source data, of which the sub-image shown in FIG. 2 is a portion, is a two-dimensional array of points, each having integer Y (vertical) and X (horizontal) coordinate values greater than or equal to zero. The pixel output data, of which target output pixel Pyx is one member, is also a two-dimensional array of points, which array may be considered as replicating the input image with a different resolution.

The input pixels of the sub-image region are identified as shown in FIG. 2 by their coordinate locations relative to the pixel in the upper left corner of the region, pixel P00. The coordinates of the target output pixel Pyx are given by convention in terms of the pixel's coordinate location relative to the center region's upper left corner pixel, pixel P12, termed the "reference" pixel. The target pixel Pyx is shown in FIG. 2 as having non-integer coordinates, as would generally be the case.

FIG. 2 illustrates the typical case where target pixel Pyx is located sufficiently far from any of the boundaries of the input pixel array that all pixels of sub-image region and the center area do in fact exist as part of the input data. In the case where pixel Pyx is located close to a boundary of the input pixel array, however, some of the pixels of FIG. 2 would not exist as part of the input data. In such a case any absent pixels are created (that is, appropriate brightness levels are assigned) in order that the center and sub-image areas be populated as required. In one optional mode of operation of a preferred embodiment of the invention, the created pixels have their brightness level values set equal to zero. In another optional mode of operation, the brightness level of each created pixel is set equal to the brightness level of the nearest pixel(s) of the input image.

As an example of the latter case, assuming target output pixel Pyx was located such that input pixel P12 had absolute coordinates (0,0), then the first row of pixels in FIG. 2 as well as the first and second columns of pixels, would not exist in the input data. In such a case, brightness levels for the missing pixels would be assigned as follows:

P00=P01=P02=P10=P11=P12;

P20=P21=P22;

P30=P31=P32;

P03=P13;

P04=P14;

P05=P15

That is, the brightness level of pixel P12 of the input data would be the value utilized for the brightness levels of created pixels P00, P01, P03, P10 and P11; the brightness level of pixel P22 of the input data would be the value utilized for the brightness levels of created pixels P20 and P21; and so forth.

With the above understood, FIGS. 3A–3E list an embodiment of the present invention. The determination of the center and sub-image pixels based on the location of the target output pixel Pyx (100 in FIG. 3A) has already been discussed.

Also as discussed previously, instrumental to the invention is the determination of the number of brightness levels exhibited by the four input pixels P12, P13, P22 and P23 of the center region surrounding the target output pixel Pyx. In blocks 120, 140 and 150 of FIG. 3A, determination is made of a number of distinct brightness levels. If the number of levels is four, video-source data is assumed and a Directional Interpolation algorithm is carried out, starting at block 160. Otherwise, graphics-source data is assumed, and a determination is made as to which one of five graphics-optimized scaling procedures should be carried out.

In the latter case, a selection is made of one of: a Default Pixel Replication algorithm, a Horizontal Pixel Replication algorithm, a Vertical Pixel Replication algorithm, a Diagonal Pixel Replication algorithm, or an Anti-diagonal Pixel Replication algorithm. The actions carried out in the case of each of these algorithms are discussed below.

Figure 4:
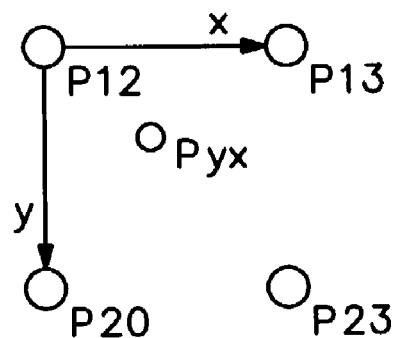
FIG. 4 illustrates a case of all four center pixels of the sub-image of the source pixel data having a same brightness level.

In the case of a single brightness level being present among all four center pixels (Y branch from 120; refer to FIG. 4), the Default Pixel Replication algorithm is employed (130) to compute the brightness level of the output target pixel Pyx. In this particular case, the level of pixel Pyx is set equal to the brightness level of the four center pixels, this being a special case of the more general algorithm.

The case of two brightness levels being present among the four center pixels (Y branch from 140) can occur in two ways. The first (Y branch from 300) covers the cases where two of the center pixels exhibit a first brightness level, and the two other center pixels exhibit a second brightness level (a "2:2 combination"). The second (N branch from 300) covers the cases where just one of the center pixels exhibits a first brightness level, and the three other center pixels exhibit a second brightness level (a "1:3 combination").

Figure 5A:
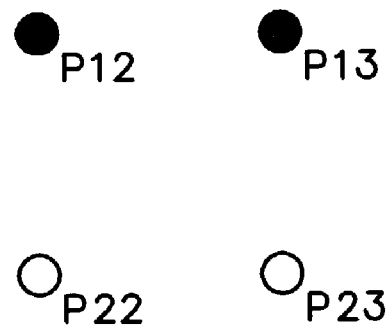
FIG. 5A illustrates a first case wherein two of the center pixels have a first brightness level and the other two pixels have a second brightness level.
Figure 5B:
FIG. 5B illustrates a second case wherein two of the center pixels have a first brightness level and the other two pixels have a second brightness level.
Figure 5C:
FIG. 5C illustrates a third case wherein two of the center pixels have a first brightness level and the other two pixels have a second brightness level.

The cases of two brightness levels among the center pixels being in 2:2 combinations are illustrated in FIGS. 5A, 5B and 5C. For the case of FIG. 5A (Y branch from 400), the Horizontal Pixel Replication algorithm is employed (410); for the case of FIG. 5B (Y branch from 420), the Vertical Pixel Replication algorithm is employed (430). For the case of FIG. 5C (N branch from 420), either the Diagonal Pixel Replication algorithm or the Anti-diagonal Pixel Replication algorithm is employed, based upon the brightness levels of the other pixels in the 4-by-4 area immediately surrounding the center area of the sub-image (440). If the number of pixels whose brightness level matches that of the center diagonal pixels (P12 and P23), denoted by Nd, is less than the number of pixels whose brightness level matches that of the center anti-diagonal pixels (P13 and P22), denoted by Na (Y branch from 450), then the Diagonal Pixel Replication algorithm is employed (460); if Na is less than Nd (Y branch from 470), then the Anti-diagonal Pixel Replication algorithm is employed (480); else (Na equal to Nd: N branch from 470) the Default Pixel Replication algorithm is employed (490). (As discussed previously with regard to determination of equality of brightness levels, determination of the relative magnitudes of Nd and Na may be carried out in a similar manner so as to lessen the influence of noise and other non-ideal factors.)

The cases of two brightness levels among the center pixels being in 1:3 combinations are illustrated in FIGS. 6 through 11. Note that in each of these figures, the light pixels are all of a first brightness level; the dark pixels are all of a second brightness level; and the cross-hatched pixels are all of the same, unspecified brightness level (possibly either the first or the second brightness level).

FIGS. 6 through 11 all illustrate the same basic configuration of pixel P12 being that center pixel which has the first brightness level, while pixels P113, P22 and P23 all have the second brightness level. It is clear that the figures thus illustrate one-fourth of all possible 1:3 combination situations, and that all of the other situations can be derived by rotation of the figures through increments of 90 degrees; therefore it suffices to illustrate just those situations shown in the figures.

Figure 6:
FIG. 6 illustrates a first case in which one of the center pixels has a first brightness level and the remaining center pixels have a second brightness level.
Figure 6:
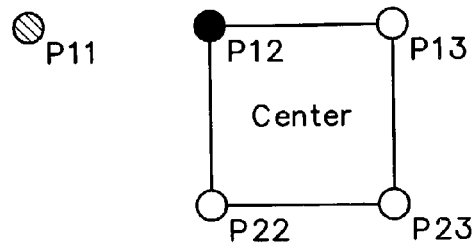
Figure 7:
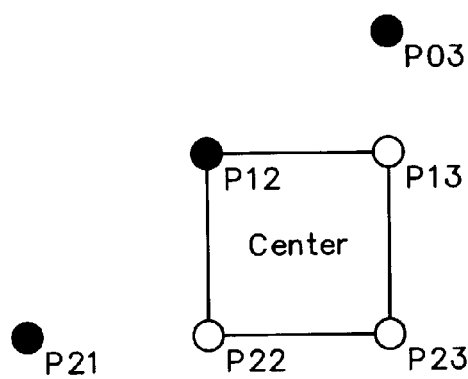
FIG. 7 illustrates a second case in which one of the center pixels has a first brightness level and the remaining center pixels have a second brightness level.
Figure 8:
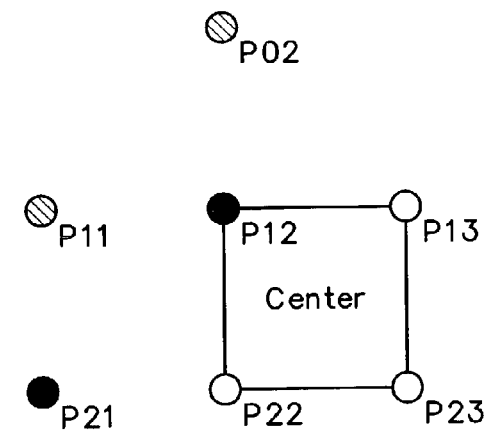
FIG. 8 illustrates a third case in which one of the center pixels has a first brightness level and the remaining center pixels have a second brightness level.

In the cases of the pixel patterns illustrated by FIGS. 6 through 8 (Y branch from 310), the Anti-diagonal Pixel Replication algorithm graphics scaling procedure is employed (320).

Figure 9:
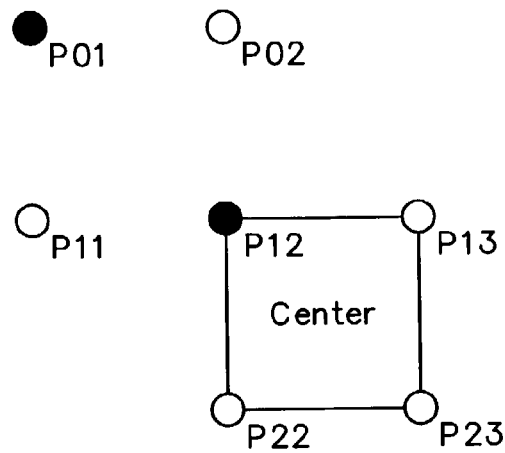
FIG. 9 illustrates a fourth case in which one of the center pixels has a first brightness level and the remaining center pixels have a second brightness level.

In the case of the pixel pattern illustrated by FIG. 9 (Y branch from 330), the Diagonal Pixel Replication algorithm graphics scaling procedure is employed (340).

Figure 10:
FIG. 10 illustrates a fifth case in which one of the center pixels has a first brightness level and the remaining center pixels have a second brightness level.

In the case of the pixel pattern illustrated by FIG. 10 (Y branch from 350), the Vertical Pixel Replication algorithm graphics scaling procedure is employed (360).

Figure 11:
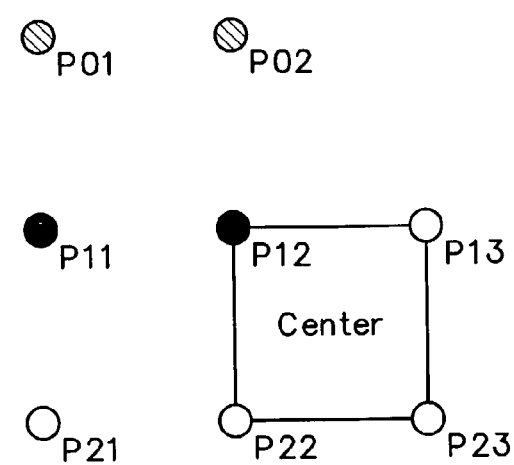
FIG. 11 illustrates a sixth case in which one of the center pixels has a first brightness level and the remaining center pixels have a second brightness level.

In the case of the pixel pattern illustrated by FIG. 11 (Y branch from 370), the Horizontal Pixel Replication algorithm graphics scaling procedure is employed (380).

In the case of all other 1:3 combination situations not covered by FIGS. 6 through 11 (N branch from 370), the Default Pixel replication algorithm graphics scaling procedure is employed (390).

The case of three brightness levels being present among the four center pixels (Y branch from 150) implies that two of the pixels have a first brightness level, the third pixel has a second brightness level, and the fourth pixel has a third brightness level. There are four basic ways in which the possible pixel patterns can occur: the two same-level pixels can be aligned either horizontally, vertically, diagonally or anti-diagonally. Refer to FIGS. 12 through 21, in which the light pixels are all of a first brightness level; the dark pixels are all of a second brightness level; and the cross-hatched pixels are all of a third brightness level (note that this differs from the illustration convention employed in FIGS. 6 through 11).

Figure 12:
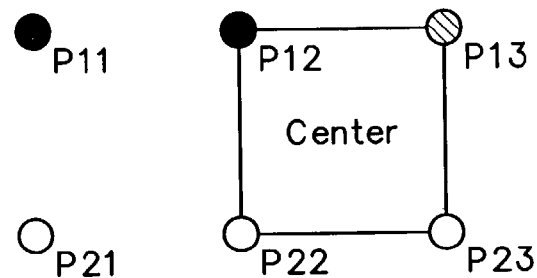
FIGS. 12, 13, 14, and 15 illustrate four cases in which two of the center pixels have a first brightness level (and are aligned horizontally), another of the center pixels has a second brightness level, and the remaining center pixel has a third brightness level.
Figure 13:
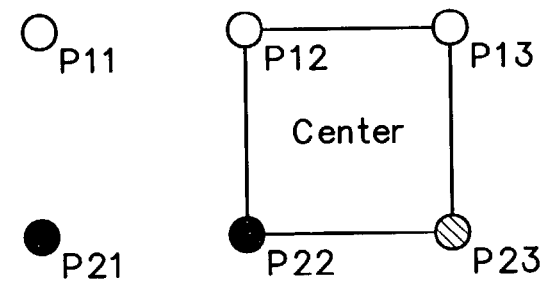

FIGS. 12 and 13 illustrate two cases where the two same-level pixels of a three-value center are aligned horizontally. If x (the relative horizontal coordinate of output target pixel Pyx) is less than 0.5 (Y branch from 500), the Horizontal Pixel Replication algorithm is employed (510), else (N branch from 500; Y branch from 580) the Default Pixel Replication algorithm is instead utilized (590).

Figure 14:
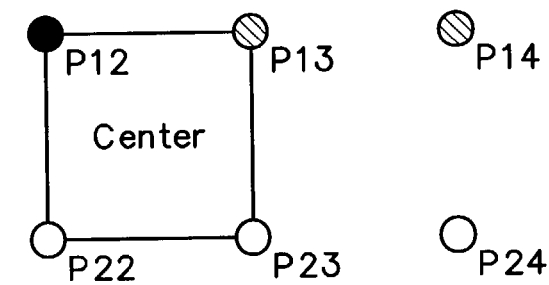
Figure 15:
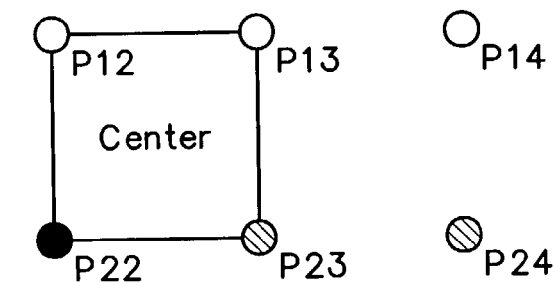

FIGS. 14 and 15 illustrate two additional cases where the two same-level pixels of a three-value center are aligned horizontally. If x is greater than or equal to 0.5 (Y branch from 500), the Horizontal Pixel Replication algorithm is employed (510), else (Y branch from 500; Y branch from 580) the Default Pixel Replication algorithm is instead utilized (590).

Figure 16:
FIGS. 16, 17, 18, and 19 illustrate four additional cases in which two of the center pixels have a first brightness level (and are aligned vertically), another of the center pixels has a second brightness level, and the remaining center pixel has a third brightness level.
Figure 16:
Figure 16:
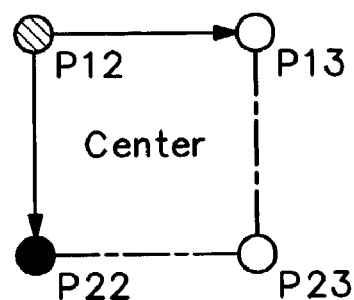
Figure 17:
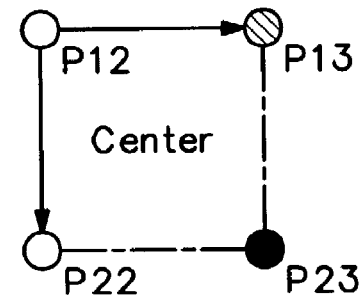

FIGS. 16 and 17 illustrate two cases where the two same-level pixels of a three-value center are aligned vertically. If y (the relative vertical coordinate of output target pixel Pyx) is less than 0.5 (Y branch from 520), the Vertical Pixel Replication algorithm is employed (530), else (N branch from 520; Y branch from 580) the Default Pixel Replication algorithm is instead utilized (590).

Figure 18:
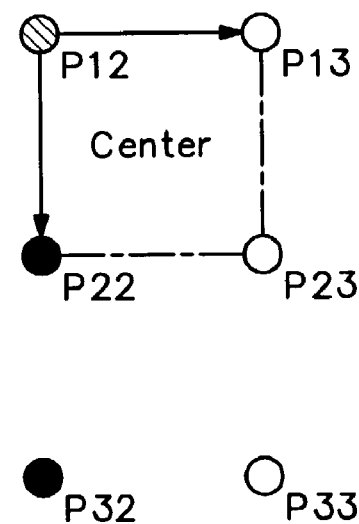
Figure 19:
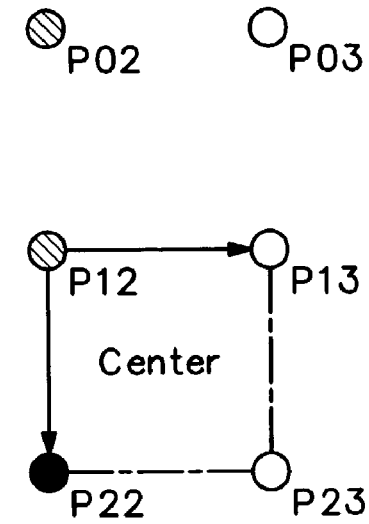

FIGS. 18 and 19 illustrate two additional cases where the two same-level pixels of a three-value center are aligned vertically. If y is greater than or equal to 0.5 (Y branch from 520), the Vertical Pixel Replication algorithm is employed (530), else (N branch from 520; Y branch from 580) the Default Pixel Replication algorithm is instead utilized (590).

Figure 20:
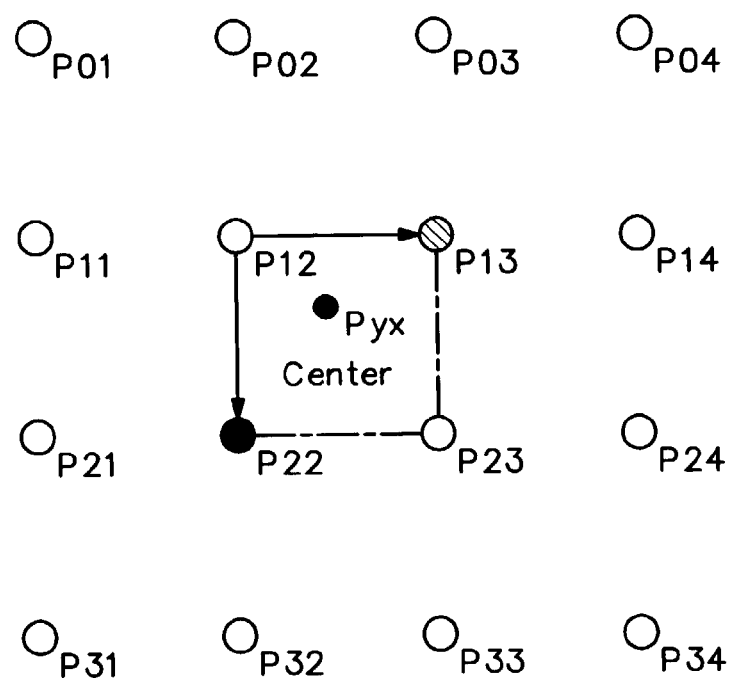
FIG. 20 illustrates a ninth case in which two of the center pixels have a first brightness level (and are aligned diagonally), another of the center pixels has a second brightness level, and the remaining center pixel has a third brightness level.

FIG. 20 illustrates a case where the two same-level pixels of a three-value center are aligned diagonally. For this case, a determination is made whether to employ an appropriate graphics scaling procedure or to employ directional interpolation to produce the target output pixel, as now described. If the brightness levels of pixels P02 and P13 are equal, and if $x \geq y$, and if $(x+y)<1$; or if the brightness levels of pixels P13 and P24 are equal, and if $x \geq y$, and if $(x+y) \geq 1$; or if the brightness levels of pixels P11 and P22 are equal, and if $x<y$, and if $(x+y) \geq 1$; or if the brightness levels of pixels P22 and P33 are equal, and if $x<y$, and if $(x+y) \geq 1$; then (Y branch from 540) the Diagonal Pixel Replication algorithm is employed (550), else (N branch from 540; N branch from 580) and the Directional Interpolation algorithm is instead utilized (160).

Figure 21:
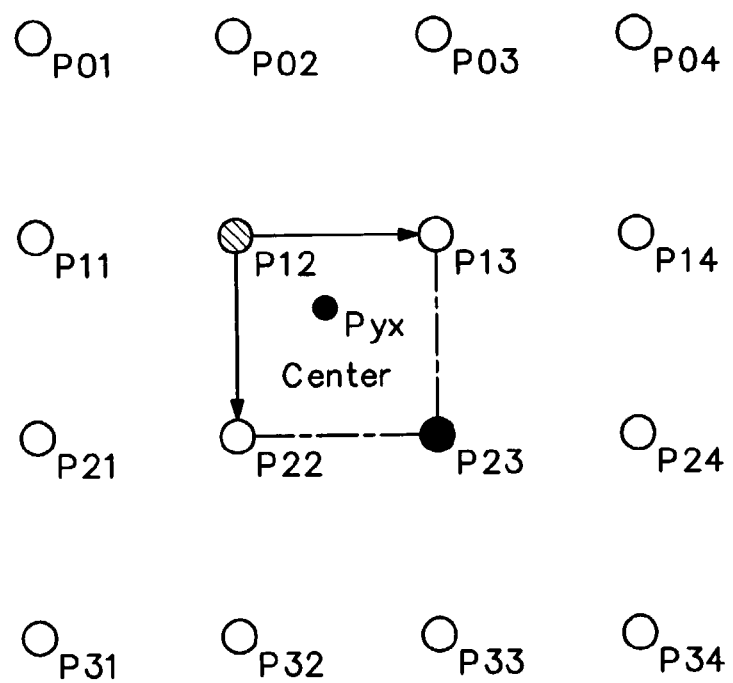
FIG. 21 illustrates a tenth case in which two of the center pixels have a first brightness level (and are aligned anti-diagonally), another of the center pixels has a second brightness level, and the remaining center pixel has a third brightness level.

FIG. 21 illustrates a case where the two same-level pixels of a three-value center are aligned anti-diagonally. For this case, a determination is made whether to employ an appropriate graphics scaling procedure or to employ directional interpolation to produce the target output pixel, as now described. If the brightness levels of pixels P03 and P12 are equal, and if $x \geq y$, and if $(x+y)<1$; or if the brightness levels of pixels P12 and P21 are equal, and if $x<y$, and if $(x+y)<1$; or if the brightness levels of pixels P14 and P23 are equal, and if $x \geq y$, and if $(x+y) \geq 1$; or if the brightness levels of pixels P23 and P32 are equal, and if $x<y$, and if $(x+y) \geq 1$; then (Y branch from 560) the Anti-diagonal Pixel Replication algorithm is employed (570), else (N branch from 560; N branch from 580) the Directional Interpolation algorithm is instead utilized (160).

For all other cases of three brightness levels being present among the four center pixels that are not addressed by the cases covered by FIGS. 12 through 21, the Directional Interpolation algorithm is employed (160) to produce the target output pixel.

The case of four brightness levels being present among the four center pixels (N branch from 150) implies that each of the pixels has a distinct brightness level. In this case, the Directional Interpolation algorithm (160) is employed to produce the target output pixel, as already discussed.

Example embodiments of each of the algorithms referred to above are now specified in more detail.

Directional Interpolation Algorithm

Figure 3A:
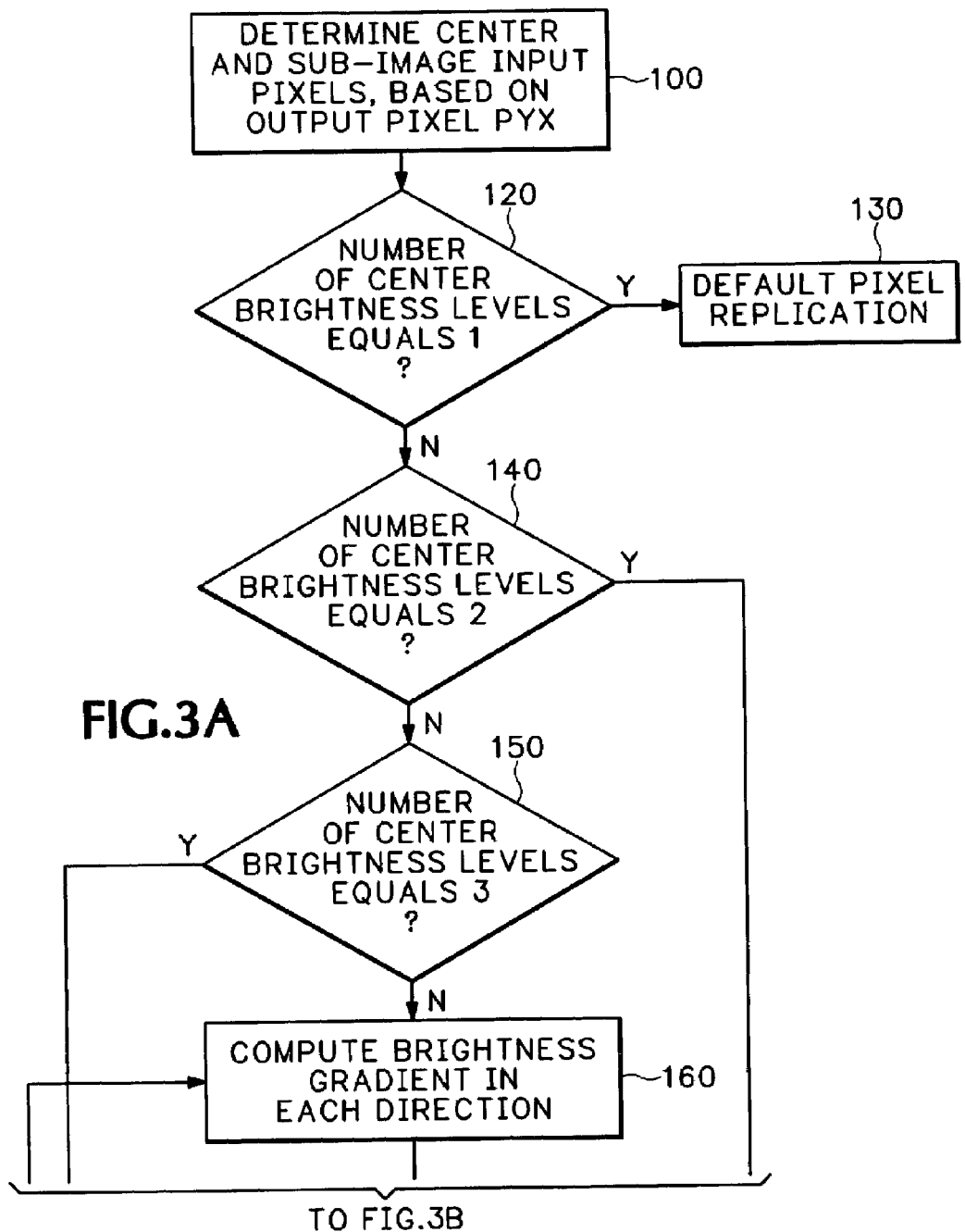
Figure 3B:
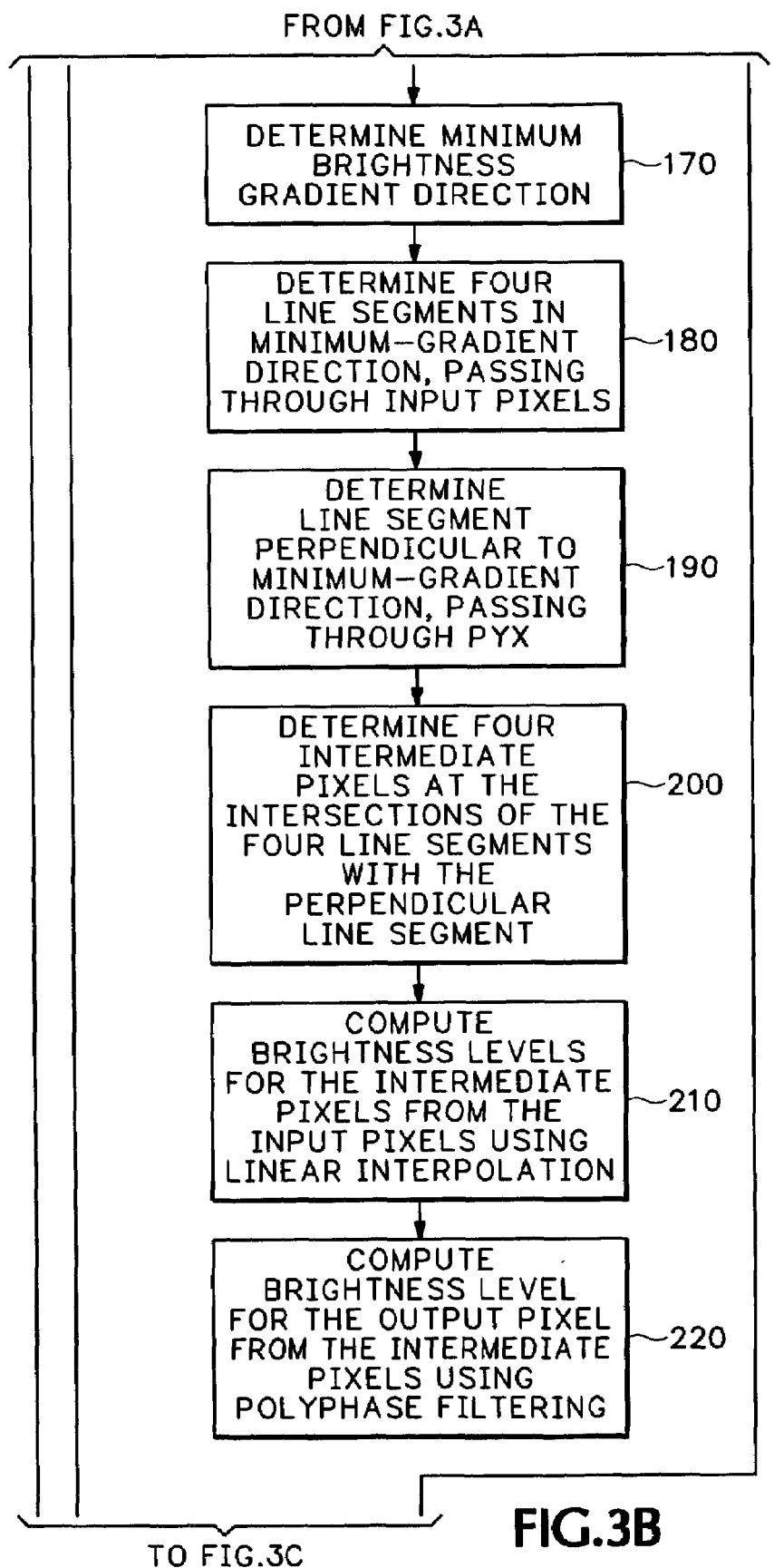
Figure 3D:
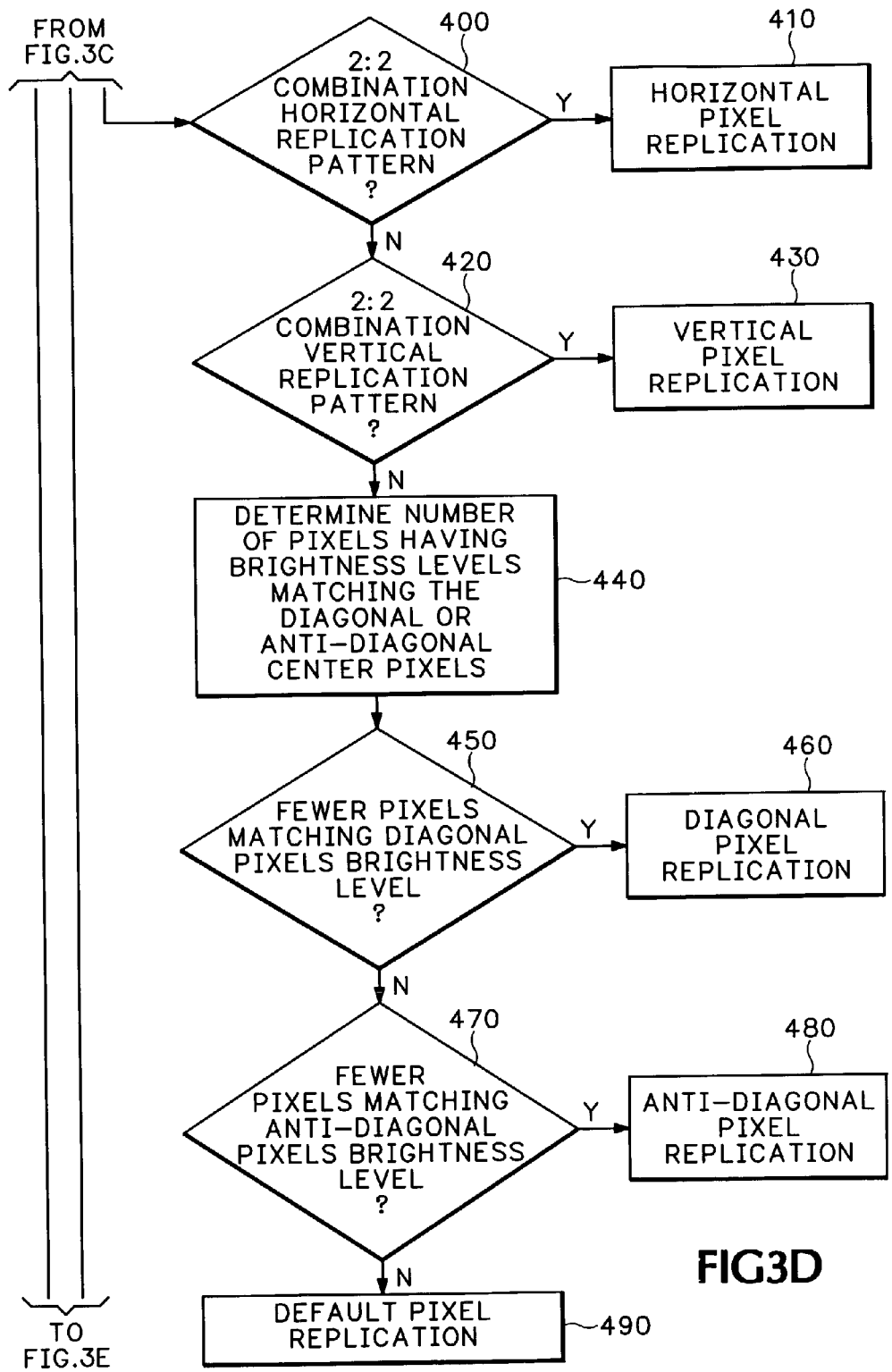
Figure 3E:
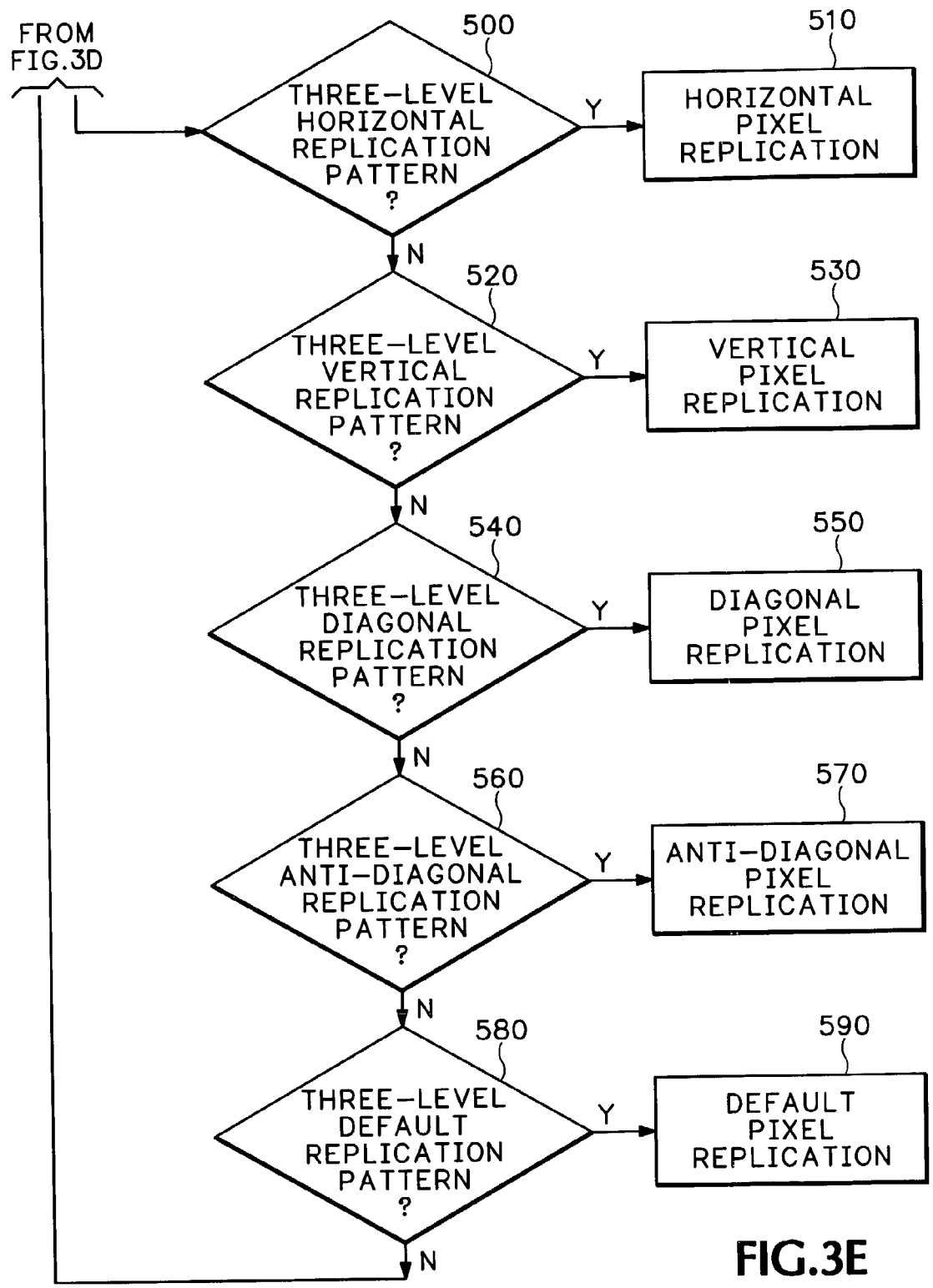

The Directional Interpolation algorithm consists of seven actions (blocks 160, 170, 180, 190, 200, 210 and 220 of FIGS. 3A–3B).

In block 160, a weighted sum of the absolute values of the differences of the brightness levels of various pairs of pixels in the sub-image is computed to determine the brightness gradient for each of several directions. In an embodiment of the invention, brightness gradients are computed for four directions: 0 degrees, 45 degrees, 90 degrees and 135 degrees relative to the horizontal (X) axis. In another embodiment of the invention, brightness gradients are computed for four additional directions: 26.6 degrees, 63.4 degrees, 116.6 degrees and 153.4 degrees.

Figure 22:
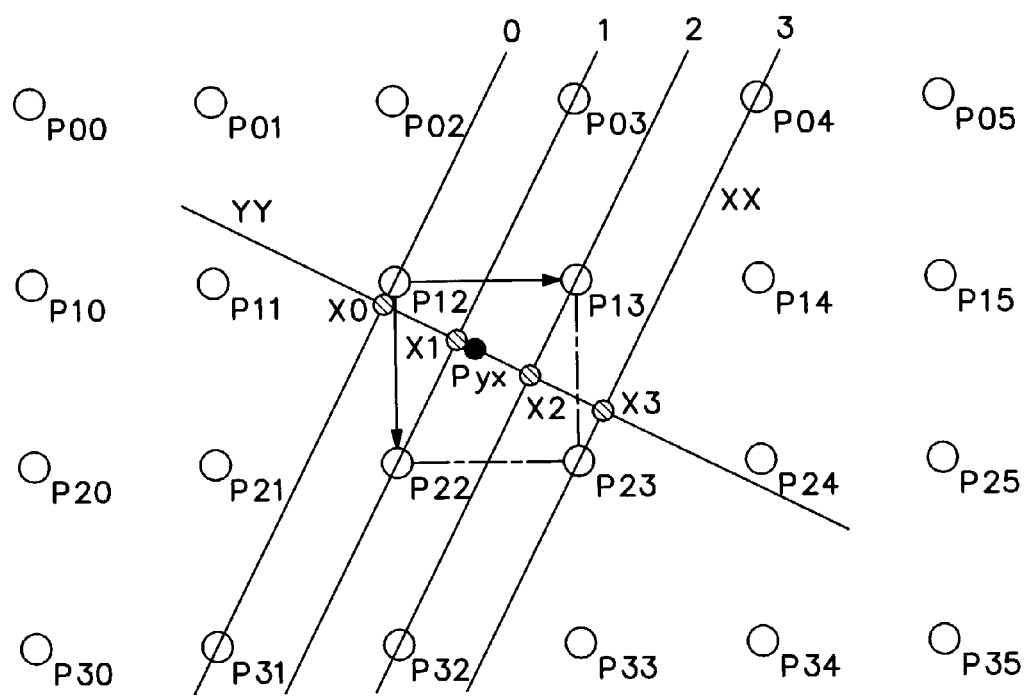
FIG. 22 shows an example of the manner in which directional interpolation is performed.

In block 170, a determination is made of which of the brightness gradients has the minimum relative value. FIG. 22 illustrates the case of the brightness gradient in the 63.4 degree direction having been determined as having the minimum relative value. This direction is identified in the figure as "XX" (not to be confused with, and generally not identical to, the horizontal X axis).

In block 180, four line segments are determined, oriented in the XX direction and passing through the four center pixels as well as other pixels of the sub-image, depending upon which direction has the minimum gradient. In FIG. 22 these line segments are identified as "0", "1", "2" and "3".

In block 190, the direction perpendicular to XX is identified; in FIG. 22 this is identified as "YY" (not to be confused with, and generally not identical to, the horizontal Y axis). A line segment is determined, oriented in the YY direction and passing through pixel Pyx.

In block 200, four intermediate pixels are determined, each located at the intersection of the XX-directed lines "0", "1", "2" and "3", and the YY-directed line passing through Pyx. In FIG. 22 these intermediate pixels are identified as "X0", "X1", "X2" and "X3".

In block 210, the brightness level of each of the intermediate pixels is computed using linear interpolation, based on the brightness levels of the two nearest pixels of the sub-image through which the associated XX-directed line segment passes. In FIG. 22, the brightness level of X0 is determined using linear interpolation based on the brightness levels of P12 and P31; X1 is likewise determined from P03 and P22; X2 is likewise determined from P13 and P32; X3 is likewise determined from P04 and P23. A person of reasonable skill in the art should recognize that other filtering techniques might be employed in alternative embodiments of the invention.

In block 220, the brightness level of the target output pixel Pyx is determined from the brightness levels of the four intermediate pixels through use of polyphase FIR filtering. A person of reasonable skill in the art should recognize that other filtering techniques might be employed in alternative embodiments of the invention.

In more detail regarding block 160, the horizontal (0 degree) gradient weighted sum is computed as follows (refer to FIG. 2):

$$S_h = w_0|P_{11}-P_{12}|+w_1|P_{12}-P_{13}|+w_2|P_{13}-P_{14}|+w_3|P_{21}-P_{22}|+w_4|P_{22}-P_{23}|+w_5|P_{23}-P_{24}|$$

The vertical (90 degree) gradient weighted sum is computed as follows:

$$S_v = w_0|P_{02}-P_{12}|+w_1|P_{12}-P_{22}|+w_2|P_{22}-P_{32}|+w_3|P_{03}-P_{13}|+w_4|P_{13}-P_{23}|+w_5|P_{23}-P_{33}|$$

The diagonal (135 degree) gradient weighted sum is computed as follows:

$$S_d = u_0|P_{01}-P_{12}|+u_1|P_{12}-P_{23}|+u_2|P_{23}-P_{34}|+u_3|P_{11}-P_{22}|+u_4|P_{22}-P_{33}|+u_5|P_{02}-P_{13}|+u_6|P_{13}-P_{24}|$$

The anti-diagonal (45 degree) gradient weighted sum is computed as follows:

$$S_a = u_0|P_{04}-P_{13}|+u_1|P_{13}-P_{22}|+u_2|P_{22}-P_{31}|+u_3|P_{03}-P_{12}|+u_4|P_{12}-P_{21}|+u_5|P_{14}-P_{23}|+u_6|P_{23}-P_{32}|$$

In the above, the weights $w_i$ and $u_i$ are a function of the position of Pyx, the target output pixel.

The fifth (153.4 degree, "diagonal-1") gradient weighted sum is computed as follows:

$$S_{1d} = t_0|P_{02}-P_{14}|+t_1|P_{01}-P_{13}|+t_2|P_{13}-P_{25}|+t_3|P_{12}-P_{24}|+t_4|P_{11}-P_{23}|+t_5|P_{10}-P_{22}|+t_6|P_{22}-P_{34}|+t_7|P_{21}-P_{33}|$$

The sixth (26.6 degree, "anti-diagonal-1") gradient weighted sum is computed as follows:

$$S_{1a} = t_0|P_{03}-P_{11}|+t_1|P_{04}-P_{12}|+t_2|P_{12}-P_{20}|+t_3|P_{13}-P_{21}|+t_4|P_{14}-P_{22}|+t_5|P_{15}-P_{23}|+t_6|P_{23}-P_{31}|+t_7|P_{24}-P_{33}|$$

The seventh (116.6 degree, "diagonal-2") gradient weighted sum is computed as follows:

$$S_{2d} = V_0|P_{00}-P_{21}|+V_1|P_{11}-P_{32}|=v_2|P_{01}-P_{22}|+V_3|P_{12}-P_{33}|+V_4|P_{02}-P_{23}|+v_5|P_{13}-P_{34}|+v_6|P_{04}-P_{25}|+v_7|P_{14}-P_{35}|$$

The eighth (63.4 degree, "anti-diagonal-2") gradient weighted sum is computed as follows:

$$S_{2a} = v_0|P_{05}-P_{24}|+v_1|P_{14}-P_{33}|+v_2|P_{04}-P_{23}|+v_3|P_{13}-P_{32}|+v_4|P_{03}-P_{22}|+v_5|P_{12}-P_{31}|+v_6|P_{02}-P_{21}|+v_7|P_{11}-P_{30}|$$

In the above, the weights $v_i$ and $t_i$ are a function of the position of Pyx, the target output pixel.

In more detail regarding 220, a FIR polyphase filter having the number of phases (denoted by N) equal to 64 is used in a preferred embodiment. In utilizing such a filter, the phase of the variable of interest must be determined. By definition, the phase of y is given as the integer part of (N*y); that is, $$phase(y) = int(N*y)$$

where the variable of interest (y) is constrained to have a value greater than or equal to 0, and less than 1. The phase of y is therefore an integer in the range from 0 to (N−1).

Filtering the brightness levels of four intermediate pixels to produce the brightness level for target output pixel Pyx implies the use of four sets of coefficients for the polyphase filter, the values of each set being a function of the phase of the variable of interest. Table 1 lists the coefficients used in a preferred embodiment of the polyphase filter.

TABLE 1

| | Polyphase filter coefficients | | | |
|---|---|---|---|---|
| Phase | Coef1 | Coef2 | Coef3 | Coef4 |
| 0 | 0 | 128 | 0 | 0 |
| 1 | −1 | 128 | 1 | 0 |
| 2 | −2 | 128 | 2 | 0 |
| 3 | −3 | 127 | 4 | 0 |

TABLE 1-continued

| | Polyphase filter coefficients | | | |
|---|---|---|---|---|
| Phase | Coef1 | Coef2 | Coef3 | Coef4 |
| 4 | −3 | 127 | 5 | −1 |
| 5 | −4 | 126 | 6 | 0 |
| 6 | −4 | 125 | 7 | 0 |
| 7 | −5 | 125 | 9 | −1 |
| 8 | −5 | 123 | 10 | 0 |
| 9 | −6 | 122 | 12 | 0 |
| 10 | −6 | 121 | 13 | 0 |
| 11 | −6 | 119 | 16 | −1 |
| 12 | −7 | 118 | 18 | −1 |
| 13 | −7 | 116 | 20 | −1 |
| 14 | −7 | 114 | 22 | −1 |
| 15 | −7 | 112 | 24 | −1 |
| 16 | −7 | 110 | 26 | −1 |
| 17 | −7 | 108 | 28 | −1 |
| 18 | −7 | 106 | 31 | −2 |
| 19 | −7 | 104 | 33 | −2 |
| 30 | −7 | 101 | 36 | −2 |
| 21 | −7 | 99 | 38 | −2 |
| 22 | −7 | 96 | 41 | −2 |
| 23 | −6 | 94 | 43 | −3 |
| 24 | −6 | 91 | 46 | −3 |
| 25 | −6 | 88 | 49 | −3 |
| 26 | −6 | 86 | 51 | −3 |
| 27 | −6 | 83 | 54 | −3 |
| 28 | −5 | 80 | 57 | −4 |
| 29 | −5 | 77 | 60 | −4 |
| 30 | −5 | 74 | 63 | −4 |
| 31 | −5 | 71 | 66 | −4 |
| 32 | −5 | 69 | 69 | −5 |
| 33 | −4 | 66 | 71 | −5 |
| 34 | −4 | 63 | 74 | −5 |
| 35 | −4 | 60 | 77 | −5 |
| 36 | −4 | 57 | 80 | −5 |
| 37 | −3 | 54 | 83 | −6 |
| 38 | −3 | 51 | 86 | −6 |
| 39 | −3 | 49 | 88 | −6 |
| 40 | −3 | 46 | 91 | −6 |
| 41 | −3 | 43 | 94 | −6 |
| 42 | −2 | 41 | 96 | −7 |
| 43 | −2 | 38 | 99 | −7 |
| 44 | −2 | 36 | 101 | −7 |
| 45 | −2 | 33 | 104 | −7 |
| 46 | −2 | 31 | 106 | −7 |
| 47 | −1 | 28 | 108 | −7 |
| 48 | −1 | 26 | 110 | −7 |
| 49 | −1 | 24 | 112 | −7 |
| 50 | −1 | 22 | 114 | −7 |
| 51 | −1 | 20 | 116 | −7 |
| 52 | −1 | 18 | 118 | −7 |
| 53 | −1 | 16 | 119 | −6 |
| 54 | 0 | 13 | 121 | −6 |
| 55 | 0 | 12 | 122 | −6 |
| 56 | 0 | 10 | 123 | −5 |
| 57 | −1 | 9 | 125 | −5 |
| 58 | 0 | 7 | 125 | −4 |
| 59 | 0 | 6 | 126 | −4 |
| 60 | −1 | 5 | 127 | −3 |
| 61 | 0 | 4 | 127 | −3 |
| 62 | 0 | 2 | 128 | −2 |
| 63 | 0 | 1 | 128 | −1 |

In more detail regarding the other actions performed in an embodiment of the Directional Interpolation algorithm, once a determination has been made regarding which of the four (or possibly eight) directions has the minimum brightness gradient, an appropriate computational procedure is carried out embodying blocks 180 through 220, as explained in detail below.

In the following, note that coef0, coef1, coef2, and coef3 are the coefficients used in the implementation of the polyphase filter and are functions of the phase of the identified variable of interest (refer to Table 1). Additionally note that the mathematical function fract is referred to, which represents taking the fraction portion of the argument.

When the minimum brightness gradient is in the horizontal (0 degree) direction:

$x0=(P02+(x*(P03-P02)));$ $x1=(P12+(x*(P13-P12)));$ $x2=(P22+(x*(P23-P22)));$ $x3=(P32+(x*(P33-P32)));$ $Pyx=((coef0(phase(y))*x0)+(coef1(phase(y))*x1)+(coef2(phase(y))*x2)+(coef3(phase(y))*x3))$ When the minimum brightness gradient is in the vertical (90 degree) direction:

$x0=(P11+(y*(P21-P11)));$ $x1=(P12+(y*(P22-P12)));$ $x2=(P13+(y*(P23-P13)));$ $x3=(P14+(y*(P24-P14)));$ $Pyx=((coef0(phase(x))*x0)+(coef1(phase(x))*x1)+(coef2(phase(x))*x2)+(coef3(phase(x))*x3))$ When the minimum brightness gradient is in the diagonal (135 degree) direction:

$x1=(P12+((x+y)*((P23-P12)/2)));$ if $x \leq Y$, $x3=(P03+((x+y)*(P14-P03)/2));$ if $(x+y)<1$, $x0=(P22+((1-x-y)*(P11-P22)/2));$ $x2=(P31+((1-x-y)*(P20-P31)/2));$ else $x0=(P22+((x+y-1)*(P33-P22)/2));$ $x2=(P31+((x+y-1)*(P42-P31)/2));$ $Pyx=((coef0(phase(x-y))*x0)+(coef1(phase(x-y))*x1)+(coef2(phase(x-y))*x2)+(coef3(phase(x-y))*x3));$ else $x3=(P21+((x+y)*(P32-P21)/2));$ if $(x+y)<1$ $x0=(P13+((1-x-y)*(P02-P13)/2));$ $x2=(P22+((1-x-y)*(P11-P22)/2));$ else $x0=(P13+((x+y-1)*(P24-P13)/2));$ $x2=(P22+((x+y-1)*(P33-P22)/2));$ $Pyx=((coef0(phase(y-x))*x0)+(coef1(phase(y-x))*x1)+(coef2(phase(y-x))*x2)+(coef3(phase(y-x))*x3))$ When the minimum brightness gradient is in the anti-diagonal (45 degree) direction:

if $(x+y)<1$, $x0=(P02+((1-x+y)*(P11-P02)/2));$ $x2=(P13+((1-x+y)*(P22-P13)/2));$ if$(x>y)$, $x1=(P12+((x-y)*(P03-P12)/2));$ $x3=(P03+((x-y)*(P14-P03)/2));$ else $x1=(P12+((y-x)*(P21-P12)/2));$ $x3=(P03+((y-x)*(P14-P03)/2));$ $Pyx=((coef0(phase(x+y))*x0)+(coef1(phase(x+y))*x1)+(coef2(phase(x+y))*x2)+(coef3(phase(x+y))*x3));$ else $x1=(P13+((1-x+y)*(P22-P13)/2));$ $x3=(P24+((1-x+y)*(P33-P24)/2));$ if$(x>y)$, $x0=(P12+((x-y)*(P03-P12)/2));$ $x2=(P03+((x-y)*(P14-P03)/2));$ else $x0=(P12+((y-x)*(P21-P12)/2));$ $x2=(P03+((y-x)*(P14-P03)/2));$ $Pyx=((coef0(phase(x+y-1))*x0)+(coef1(phase(x+y-1))*x1)+(coef2(phase(x+y-1))*x2)+(coef3(phase(x+y-1))*x3))$ When the minimum brightness gradient is in the diagonal-1 (153.4 degree) direction:

$a=fract(1-x+(2*y));$ $x1=(P12+((y+(2*x))*(P24-P12)/5));$ $x2(P23+(((3-y)-(2-x))*(P11-P23)/5));$ if$((2*y)-x)<1,$ if $((2*x)+y)<2,$ $x0=(P13+((2-(2*x)-y)*(P01-P13)/5));$ else $x0=(P13+((2-(2*x)-y)*(P25-P13) 5));$ if $x>(2*y)$, $x3=(P14+((4-(2*x)-y)*(P02-P14) 5));$ $Pyx=((coef0(phase(a))-x3)+(coef1(phase(a))*x0)+(coef2(phase(a))*x1)+(coef3(phase(a))*x2));$ else if$((2*x)+y) \geq 1,$ $x3=(P22+(((2*x)+y-1)*(P34-P22) 5));$ Else $x3=(P22+((1-(2*x)-y)*(P10-P22)/5));$ $Pyx=((coef0(phase(a))*x0)+(coef1(phase(a))*x1)+(coef2(phase(a))*x2)+(coef3(phase(a))*x3));$ else $x0=(P21+((1+(2*x)+y)*(P33-P21)/5));$ if$(y+(2*x))>1\times$ $x3=(P22+((y+(2*x)-1)*(P34-P22)/5));$ else $x3=(P22+((1-(2*x)-y)*(P10-P22)/5));$ $Pyx=((coef0(phase(a))*x1)+(coef1(phase(a))*x2)+(coef2(phase(a))*x3)+(coef3(phase(a))*x0))$ When the minimum brightness gradient is in the anti-diagonal-1 (26.6 degree) direction:

$a=\text{fract}(x+(2*y));$ $x1=(P13+((2+y(2*x))*(P21-P13)/5));$ $x2=(P22+((1-y+(2*x))*(P14-P22)/5));$ if$((2*y)+x)<2,$ if $y<(2*x),$ $x0=(P12+(((2*x)-y)*(P04-P12)/5));$ else $x0=(P12+(((2*x)-y)*(P20-P12)/5));$ if$(x+(2*y))<1,$ $x3=(P11+((2+(2*x)-y)*(P03-P11)/5));$ $Pyx=((coef0(phase(a))*x3)+(coef1(phase(a))*x0)+(coef2(phase(a))*x1)+(coef3(phase(a))*x2));$ else if$(y+1)<(2*x),$ $x3=(P23+(((2*x)-y)*(P31-P23) 5));$ else $x3=(P23+(((2*x)-y)*(P15-P23)5));$ $Pyx=((coef0(phase(a))*x0)+(coef1(phase(a))*x1)+(coef2(phase(a))*x2)+(coef3(phase(a))*x3))$ else $x0=(P24+((3-(2*x)+y)*(P32-P24)/5));$ if $(y+1)<(2*x),$ $x3=(P23+(((2*x)-y)*(P31-P23)/5));$ else $x3(P23+(((2*x)-y)*(P15-P23)/5));$ $Pyx=((coef0(phase(a))*x1)+(coef1(phase(a))*x2)+(coef2(phase(a))*x3)+(coef3(phase(a))*x0))$ When the minimum brightness gradient is in the diagonal-2 (116.6 degree) direction:

$a=\text{fract}((1-y)+(2*x));$ $x1=(P12+((x+(2*y))*(P33-P12)/5));$ $x2=(P23+((3-x-(2*y))*(P02-P23)/5));$ if$((2*x)-y)<1,$ $x0=(P22+((2-(2*y)-x)*(P01-P22)/5));$ if $y>(2*x),$ $x3=(P11+(((4-x-(2*y))*(P32-P11)/5));$ $Pyx=((coef0(phase(a))*x3)+(coef1(phase(a))*x0)+(coef2(phase(a))*x1)+(coef3(phase(a))*x2));$ else $x3=(P13+(((2*y)+x-1)*(P34-P13)/5));$ $Pyx=((coef0(phase(a))*x0)+(coef1(phase(a))*x1)+(coef2(phase(a))*x2)+(coef3(phase(a))*x3));$ else $x0=(P03+((1+(2*x)+y)*(P24-P03)/5));$ $x3=(P13+((y+(2*x)-1)*(P34-P13)/5));$ $Pyx=((coef0(phase(a))*x1)+(coef1(phase(a))*x2)+(coef2(phase(a))*x3)+(coef3(phase(a))*x0))$ When the minimum brightness gradient is in the anti-diagonal-2 (63.4 degree) direction:

$a=\text{fract}(y+(2*x));$ $x1=(P22+((2+x-(2*y))*(P03-P22)/5);$ $x2=(P13+((1-x+(2*y))*(P32-P13)/5));$ if$(y+(2*x))<2,$ $x0=(P12+(((2*y)-x)*(P31-P12)/5));$ if $((2*x)+y)<1,$ $x3=(P02+((2+(2*y)-x)*(P21-P02)/5));$ $Pyx=((coef0(phase(a))*x3)+(coef1(phase(a))*x0)+(coef2(phase(a))*x1)+(coef3(phase(a))*x2));$ else $x3=(P23+((1-(2*y)+x)*(P04-P23)/5));$ $Pyx=((coef0(phase(a))*x0)+(coef1(phase(a))*x1)+(coef2(phase(a))*x2)+(coef3(phase(a))*x3));$ else $x0=(P33+(3+x-(2*y))*(P14-P33)/5));$ $x3=(P23+((1+x-(2*y))*(P04-P23)/5));$ $Pyx=((coef0(phase(a))*x1)+(coef1(phase(a))*x2)+(coef2(phase(a))*x3)+(coef3(phase(a))*x0))$

Default Pixel Replication Algorithm

In the following, as well as in the later descriptions of the other Pixel Replication algorithms, inHeight and outHeight represent the vertical extent of the input and output images respectively; inWidth and outWidth represent the horizontal extent of the input and output images respectively.

$h$Lambda=(inWidth/outWidth);

$v$Lambda=(inHeight/outHeight);

If $y<=((1-v\text{Lambda})/2)$,

If $x<((1-h\text{Lambda})/2), Pyx=P12$;

Else if $x>((1+h\text{Lambda})/2), Pyx=P13$;

Else $Pyx=P13+((P14-P13)*((x-((1-h\text{Lambda})/2))/h\text{Lambda}))$;

Else if $y>=((1+v\text{Lambda})/2)$,

If $x<((1-h\text{Lambda})/2), Pyx=P22$;

Else if $x>((1+h\text{Lambda})/2), Pyx=P23$;

Else $Pyx=P22+((P23-P22)*((x-((1-h\text{Lambda})/2))/h\text{Lambda}))$;

Else

If $x<((1-h\text{Lambda})/2)$, $Pyx=P12+((P22-P12)*((y-((1-v\text{Lambda})/2))/v\text{Lambda}))$;

Else if $x>((1+h\text{Lambda})/2)$, $Pyx=P13+((P23-P13)*((y-((1-v\text{Lambda})/2))/v\text{Lambda}))$;

Else $Px1=P12+((P13-P12)*((x-((1-h\text{Lambda})/2))/h\text{Lambda}))$;

$Px2=P22+((P23-P22)*((x-((1-h\text{Lambda})/2))/h\text{Lambda}))$;

$Pyx=Px1+((Px2-Px1)*((y-((1-v\text{Lambda})/2))/v\text{Lambda}))$

Horizontal Pixel Replication Algorithm $v$Lambda=(inHeight/outHeight);

If $y[((1-v\text{Lambda})/2)$,

If $x<0.5, Pyx=P12$;

Else Pyx=P13;

Else if $y\mu((1+v\text{Lambda})/2)$,

If $x<0.5, Pyx=P22$;

Else Pyx=P23;

Else

If $x<0.5$, $Pyx=P12+((P22-P12)*((y-((1-v\text{Lambda})/2))/v\text{Lambda}))$;

Else $Pyx=P13+((P23-P13)*((y((1-v\text{Lambda})/2))/v\text{Lambda}))$

Vertical Pixel Replication Algorithm $v$Lambda=(inWidth/outWidth);

If $x[((1-v\text{Lambda})/2)$,

If $y<0.5, Pyx=P12$;

Else Pyx=P22;

Else if x$\mu((1+h\text{Lambda})/2)$,

If $y<0.5, Pyx=P13$;

Else Pyx=P23;

Else

If $y<0.5$, $Pyx=P12+((P13-P12)*((x-((1-h\text{Lambda})/2))/h\text{Lambda}))$;

Else $Pyx=P22+((P23-P22)*((x-((1-h\text{Lambda})/2))/h\text{Lambda}))$

Diagonal Pixel Replication Algorithm Lambda=(((inWidth/outWidth)+(inHeight/outHeight))/2);

If$(1-x+y)[((1-\text{Lambda})/2), Pyx=P13$;

Else if$(1-x+y)<((1+\text{Lambda})/2)$,

If$(x+y)<1$, $Pyx=P13+((P12-P13)*((1-x+y-((1-\text{Lambda})/2))/\text{Lambda}))$;

Else $Pyx=P13+((P23-P13)*((1-x+y-((1-\text{Lambda})/2))/\text{Lambda}))$;

Else if$(1-x+y)[((3-\text{Lambda})/2)$,

If$(x+y)<1, Pyx=P12$;

Else Pyx=P23;

Else if$(x+y)<((3+\text{Lambda})/2)$,

If$(x+y)<1$, $Pyx=P12+((P22-P12)*((1-x+y-((3-\text{Lambda})/2))/\text{Lambda}))$;

Else $Pyx=P23+((P22-P23)*((1-x+y-((3-\text{Lambda})/2))/\text{Lambda}))$;

Else Pyx=P22

Anti-Diagonal Pixel Replication Algorithm
Lambda=(((inWidth/outWidth)+(inHeight/outHeight))/2);

If$(x+y)$[$((1-\text{Lambda})/2)$,Pyx=P12;

Else if$(x+y)<((1+\text{Lambda})/2)$,

If$(x>y)$, $Pyx=P12+((P13-P12)*((x+y-((1-\text{Lambda})/2))/\text{Lambda}))$;

Else $Pyx=P12+((P22-P12)*((x+y-((1-\text{Lambda})/2))/\text{Lambda}))$;

Else if$(x+y)<((3-\text{Lambda})/2)$,

If $x>y$,Pyx=P13;

Else Pyx=P22;

Else if $(x+y)<((3+\text{Lambda})/2)$,

If x>y, $Pyx=P22+((P23-P22)*((x+y-((3-\text{Lambda})/2))/\text{Lambda}))$;

Else $Pyx=P13+((P23-P13)*((x+y-((3-\text{Lambda})/2))/\text{Lambda}))$;

Else Pyx=P23

While embodiments of the invention has been shown and described, it will be apparent to those skilled in the art that many other changes and modifications may be made without departing from the invention in its broader aspects. It is therefore intended that the appended claims cover all such changes and modifications coming within the scope and spirit of the accompanying claims.

What is claimed is:

1. A method for scaling an image, comprising:
   determining a sub-image including an array of input pixels;
   evaluating a brightness for each input pixel contained within the sub-image;
   determining a number of input pixels having a same brightness;
   determining whether a combinational or three level replication pattern exists in the input pixels in the sub-image;
   selecting a default pixel replication algorithm responsive to determining the same brightness for all input pixels in the sub-image;
   selecting one of a anti-diagonal, diagonal, vertical, horizontal, and default pixel replication algorithms responsive to determining two brightness levels in the input pixels in the sub-image and responsive to the direction of combinational replication pattern exhibited by the two brightness levels;
   selecting one of a anti-diagonal, diagonal, vertical, horizontal, and default pixel replication algorithms responsive to determining three brightness levels in the input pixels in the sub-image and responsive to the direction of three level replication pattern exhibited by the three brightness levels; and
   performing a replication algorithm based on the direction of minimum brightness gradient responsive to determining more than three brightness levels in the input pixels of the sub-image.

2. The method of claim 1 where performing the replication algorithm based on the direction of minimum brightness gradient comprises:
   determining whether the sub-image originates from a graphic or video source;
   evaluating a weighted directional absolute difference;
   determining a direction of minimum weighted directional absolute difference; and
   selecting a directional interpolation technique responsive to the direction of minimum weighted directional absolute difference.

3. The method of claim 1 where performing the replication algorithm based on the direction of minimum brightness gradient comprises:
   computing a brightness gradient for each of a plurality of directions;
   determining a minimum brightness gradient direction responsive to the computing; and
   interpolating an output pixel responsive to the minimum brightness gradient direction.

4. The method of claim 3 comprising:
   orienting a plurality of line segments in the minimum brightness gradient direction, each line segment passing through at least one of the input pixels of the sub-image;
   identifying an orthogonal line segment to the plurality of line segments;
   determining a plurality of intermediate pixels at the intersection of the plurality of line segments and the orthogonal line segment.

5. The method of claim 4 wherein identifying an orthogonal line segment includes running the orthogonal line segment through an output pixel.

6. The method of claim 4 comprising computing a brightness level for each of the intermediate pixels.

7. The method of claim 6 wherein computing the brightness level for each of the intermediate pixels includes using linear interpolation.

8. The method of claim 6 wherein interpolating the output pixel includes computing a brightness level for the output pixel responsive to computing the brightness level for each of the intermediate pixels.

9. The method of claim 3 wherein interpolating the output pixel includes determining a brightness level of the output pixel using a filtering technique.

10. The method of claim 3 wherein computing the brightness gradient includes computing a brightness gradient for each of 0, 45, 90, and 135 degrees.

11. The method of claim 3 wherein computing the brightness gradient includes computing a brightness gradient for each of 26.6, 63.4, 116.6, and 161.6 degrees.

12. The method of claim 3 wherein computing the brightness gradient includes computing a weighted sum of absolute values of brightness level differences of a plurality of pairs of input pixels in the sub-image.

13. The method of claim 1 where determining whether the combinational or three level replication patterns exists includes:
    determining one of an anti-diagonal, diagonal, vertical, and horizontal combinational replication pattern.

14. The method of claim 1 where determining whether a combinational or three level replication pattern exists includes:
    determining one of an anti-diagonal, diagonal, vertical, and horizontal three level replication pattern.

15. An apparatus, comprising:
    means for determining a sub-image including an array of input pixels;
    means for evaluating a brightness for each input pixel contained within the sub-image;
    means for determining a number of input pixels having a same brightness;
    means for determining whether a combinational or three level replication pattern exists in the input pixels in the sub-image;
    means for applying a default pixel replication algorithm responsive to determining the same brightness for all input pixels in the sub-image;
    means for applying one of a anti-diagonal, diagonal, vertical, horizontal, and default pixel replication algorithms responsive to determining two brightness levels in the input pixels in the sub-image and responsive to the direction of combinational replication pattern exhibited by the two brightness levels;
means for applying one of a anti-diagonal, diagonal, vertical, horizontal, and default pixel replication algorithms responsive to determining three brightness levels in the input pixels in the sub-image and responsive to the direction of three level replication pattern exhibited by the three brightness levels; and
    means for performing a replication algorithm based on the direction of minimum brightness gradient responsive to determining more than three brightness levels in the input pixels of the sub-image.

16. The apparatus of claim 15 where the means for performing the replication algorithm based on the direction of minimum brightness gradient comprises:
    means for determining whether the sub-image originates from a graphic or video source;
    means for evaluating a weighted directional absolute difference;
    means for determining a direction of minimum weighted directional absolute difference; and
    means for selecting a directional interpolation technique responsive to the direction of minimum weighted directional absolute difference.

17. The apparatus of claim 15 where the means for performing the replication algorithm based on the direction of minimum brightness gradient comprises:
    means for computing a brightness gradient for each of a plurality of directions;
    means for determining a minimum brightness gradient direction responsive to the brightness gradient; and
    interpolating an output pixel responsive to the minimum brightness gradient direction.

18. The apparatus of claim 17 comprising:
    means for orienting a plurality of line segments in the minimum brightness gradient direction, each line segment passing through at least one of the input pixels of the sub-image;
    means for identifying an orthogonal line segment to the plurality of line segments; and
    means for determining a plurality of intermediate pixels at the intersection of the plurality of line segments and the orthogonal line segment.

19. The apparatus of claim 18 wherein the means for identifying an orthogonal line segment includes means for running the orthogonal line segment through an output pixel.

20. The apparatus of claim 18 comprising means for computing a brightness level for each of the intermediate pixels.

21. The apparatus of claim 20 wherein the means for computing the brightness level for each of the intermediate pixels uses linear interpolation.

22. The apparatus of claim 20 wherein the means for interpolating the output pixel includes means for computing a brightness level for the output pixel responsive to the means for computing the brightness level for each of the intermediate pixels.

23. The apparatus of claim 17 wherein the means for interpolating the output pixel includes means for determining a brightness level of the output pixel using means for filtering.

24. The apparatus of claim 17 wherein the means for computing the brightness gradient includes means for computing a brightness gradient for each of 0, 45, 90, and 135 degrees.

25. The apparatus of claim 17 wherein the means for computing the brightness gradient includes means for computing a brightness gradient for each of 26.6, 63.4, 116.6, and 161.6 degrees.

26. The apparatus of claim 17 wherein the means for computing the brightness gradient includes means for computing a weighted sum of absolute values of brightness level differences of a plurality of pairs of input pixels in the sub-image.

27. The apparatus of claim 15 where the means for determining whether the combinational or three level replication patterns exists includes:
    means for determining one of an anti-diagonal, diagonal, vertical, and horizontal combinational replication pattern.

28. The apparatus of claim 15 where the means for determining whether a combinational or three level replication pattern exists includes:
    means for determining one of an anti-diagonal, diagonal, vertical, and horizontal three level replication pattern.

* * * * *